(12) United States Patent
Holm et al.

(10) Patent No.: US 7,648,052 B2
(45) Date of Patent: Jan. 19, 2010

(54) VISCOUS MEDIUM FEEDER

(75) Inventors: William Holm, Alvsjo (SE); Kenth Nilsson, Akersberga (SE); Peter Svalling, Bromma (SE)

(73) Assignee: Mydata Automation AB, Bromma (SE)

( * ) Notice: Subject to any disclaimer, the term of this patent is extended or adjusted under 35 U.S.C. 154(b) by 327 days.

(21) Appl. No.: 10/498,247

(22) PCT Filed: Dec. 12, 2002

(86) PCT No.: PCT/SE02/02328

§ 371 (c)(1),
(2), (4) Date: Jun. 10, 2004

(87) PCT Pub. No.: WO03/051526

PCT Pub. Date: Jun. 26, 2003

(65) Prior Publication Data

US 2005/0092774 A1    May 5, 2005

(30) Foreign Application Priority Data

Dec. 14, 2001 (SE) .................. 0104210

(51) Int. Cl.
*B05C 5/02* (2006.01)
*B29C 47/66* (2006.01)

(52) U.S. Cl. .............. 222/413; 222/261; 222/262; 222/263; 222/504; 222/420; 222/63; 418/48

(58) Field of Classification Search ............... 222/61, 222/63, 256, 260–263, 412, 413, 504, 252; 418/48

See application file for complete search history.

(56) References Cited

U.S. PATENT DOCUMENTS

| 3,840,154 | A | * | 10/1974 | Speak ................. 222/181.2 |
| 4,778,080 | A | * | 10/1988 | Ono et al. .............. 222/55 |
| 5,065,910 | A | * | 11/1991 | Fiedler ................. 222/504 |
| 5,407,337 | A | * | 4/1995 | Appleby ................ 418/166 |
| 5,564,606 | A |   | 10/1996 | Engel |
| 6,082,289 | A |   | 7/2000 | Cavallaro |
| 6,234,358 | B1 | * | 5/2001 | Romine et al. ......... 222/181.3 |
| 6,562,406 | B1 | * | 5/2003 | Chikahisa et al. ........ 427/256 |

FOREIGN PATENT DOCUMENTS

| DE | 26 49 045 A1 | 5/1978 |
| EP | 0 865 896 A1 | 9/1998 |
| JP | 2-37196 A | 2/1990 |
| JP | 7-75870 A | 3/1995 |
| JP | 9-181434 A | 7/1997 |
| WO | WO 94/23930 A1 | 10/1994 |
| WO | WO 99/64167 A1 | 12/1999 |
| WO | WO 00/61297 A1 | 10/2000 |

* cited by examiner

*Primary Examiner*—J. Casimer Jacyna
(74) *Attorney, Agent, or Firm*—Birch, Stewart, Kolasch & Birch, LLP

(57) ABSTRACT

A viscous medium feeder, which has an inlet, an outlet, a tubular portion, a rotatable cylindrical shaft arranged in and extending coaxially with the tubular portion, and a drive motor connected to the shaft. The tubular portion has an internal thread, which is connected, at one end thereof, to the inlet, and, at the other end thereof, to the outlet. Further, the tubular portion is elastic, and the shaft abuts the inner wall portions of the tubular portion.

14 Claims, 3 Drawing Sheets

VISCOUS MEDIUM FEEDER

TECHNICAL FIELD

This invention relates generally to the field of feeding viscous mediums, and in particular it relates to feeding the viscous medium within a jetting device.

TECHNICAL BACKGROUND

In a jetting device the medium to be jetted is first transported, or fed, to a chamber, and then ejected from the chamber through a nozzle. Thus a droplet of the medium leaves the device and, typically, impacts a closely arranged surface and thereby forms a dot on the surface. The operation of feeding the medium to the chamber is of great influence for the performance of the device, for example as regards the jetted amount, i.e. the volume of the droplet.

A prior art device showing an overall good performance is disclosed in WO 99/64167, where the principal parts of the feeder are a tubular portion defined by a plurality of O-rings, which are disposed in a cylindrical boring, and which are stacked on top of each other; and a threaded shaft that extends through the tubular portion. At an upper end of the thread there is provided an inlet for the viscous medium, and at a lower end thereof there is provided an outlet. The outlet communicates with a chamber of an eject mechanism, and said chamber opens at a nozzle. In order to fill the chamber with the medium, the shaft, which could be regarded as a screw, is rotated, for example for a fraction of a turn, whereby the medium is forced out of the outlet and into the chamber. The eject mechanism then pushes the medium out through the nozzle by rapidly and temporarily decreasing the volume of the chamber.

However, due to small dimensions, the screw is difficult to manufacture with high precision, and the stack of O-rings, while providing a good flexible seal towards the thread of the screw, is not optimal as regards the transport of the medium through the feeder, since some amounts of the medium tend to get stuck at a bottom area of the narrow recesses formed between adjacent O-rings.

There is, however, another type of device which comprises a feeder that does not suffer from the problems of the feeding screw. The device is an extruder as shown in the published German patent application DE 2 649 045. The feeder of the extruder comprises a cylindrical shaft and tubular portion having an internal thread. When the cylindrical shaft is rotated the plastic granule is dragged along in the rotation. The thread guides and redirects the rotational movement of the plastic granule into a movement along the thread, and, thus, the granule is fed forward through the feeder.

This prior art feeder works well in an extruder, and it would be desirable to use the same feeder principle in a jetting device. However, the extruder feeder has a clearance or gap between the wall of the feeder tube and the shaft. The gap is necessary in order to keep the heat increase due to friction on an acceptable level, but results in a problem of leakage when it comes to the viscous mediums that are used in a jetting device. If the principle structure of the prior art extruder feeder would be applied to a feeder of a jetting device, there would be a problem of obtaining an equal droplet size. When the shaft would be rotated in order to feed an amount of the medium into the eject chamber, a pressure is generated, which would in turn force an amount of the viscous medium back through the gap. Due to the small dimensions of the feeder and small volume of each droplet, an arbitrary or not fully controllable variation of the droplet size introduces an undesired problem.

In addition, it would not be possible to eliminate the gap, since then the shaft would not be rotatable.

SUMMARY OF THE INVENTION

The object of this invention is to provide a feeder which lacks of the deficiencies of the prior art feeders.

The object is achieved by a viscous medium feeder as well as by a feeder tube according to the appended claims.

In one aspect of the present invention the viscous medium feeder comprises an inlet, an outlet, a tubular portion having an internal thread connected, at one end thereof, to said inlet, and connected, at the other end thereof, to said outlet, a rotatable cylindrical shaft arranged in and extending coaxially with said tubular portion, and a drive motor connected to said shaft. The tubular portion is elastic, and the shaft abuts inner wall portions of said tubular portion.

In another aspect of the invention the feeder tube, which is mountable in a viscous medium feeder, comprises an inlet, an outlet and a tubular portion having an internal thread connected, at one end thereof, to said inlet, and connected, at the other end thereof, to said outlet. The tubular portion is elastic.

By providing the tubular portion with one or more internal threads, the above-mentioned problems of the prior art O-rings are eliminated while an advantage of the prior art extruder feeder is retained. The/each internal thread embodies a distinct and continuous canal wherein the viscous medium is easily forced ahead.

Additionally, due to this internal thread, it is possible to omit the external thread from the shaft, which rather is provided as a cylindrical shaft. When the shaft is rotated, the medium, due to its viscosity, is dragged along in the rotational movement. This effect is obtained even when the surface of the shaft is completely smooth. However, the rotational movement of the medium is redirected by the internal thread of the tubular portion, and consequently the medium is fed along the thread and out of the tubular portion through the outlet.

Further, the tubular portion is elastic, which permits the shaft of the feeder to abut wall portions of the tubular portion. Thereby, the problem of leakage as discussed above in conjunction with the prior art extruder feeder will not occur when the feeder according to the invention is used in a jetting device. On the contrary, a sealing is provided between the shaft and the wall portions, leading to an efficient feeding of the medium along the thread(s). Still, due to the elasticity or resilience, properties, when the medium comprises small metal particles such as the powder of a solder paste, there is a possibility for the particles to actually pass between the wall portions and the shaft without being smeared. This is important since, when feeding solder paste and the like, smearing is a common problem. Further, the elasticity properties allows for wider tolerances for the straightness of the shaft and for vibrations of the shaft rotation. This advantage of the wider tolerances is true also in comparison with the prior art extruder feeder.

The inventive mechanical structure of the feeder has shown a further effect. When using the prior art screw feeder in a jetting device it has been difficult to obtain an even volume of the jetted droplets. Occasionally, the variations have been cyclic. The variations are small yet significant to certain applications where the requirements of precision are extremely high. However, by means of the structure of the feeder according to this invention, surprisingly, the volume variations have been substantially eliminated. It is believed that the major cause is that the fixed internal thread renders a more constant feeding of the medium than the rotating external thread of the prior art feeder. An additional variation reducing effect is probably obtained by the inlet being connected to one end of the thread. This means that the viscous medium is led directly into the thread, which more or less eliminates a risk of an uneven filling of the thread.

As an additional advantage the manufacture of the shaft is substantially simplified compared to the manufacture of the prior art screw.

For the purposes of this application, it is to be noted that the term "viscous medium" should be interpreted as solder paste, flux, adhesive, conductive adhesive, or any other kind of medium used for fastening components on a substrate, conductive ink, resistive paste, or the like; and that the term "substrate" should be interpreted as a printed circuit board (PCB), a substrate for ball grid arrays (BGA), chip scale packages (CSP), quad flat packages (QFP), wafers, flip-chips, or the like.

In advantageous embodiments the tubular portion preferably is made from an elastomer such as, for example, rubber. An elastomer is desirable in that it offers good sealing properties, while having sufficient flexibility. Additionally, it can be manufactured by injection moulding or by moulding by means of some other simple and cost efficient method.

In other advantageous embodiments, the thread has a curved bottom. In other words, the helical groove of the thread, which defines and extends along the helical ridge of the thread, has a cross-section without sharp corners. The groove is rather U-shaped or the like. This provides for a good release of the medium and prevents the medium from getting stuck at corner areas of the groove, which is otherwise likely to occur.

In yet further advantageous embodiments, the tubular portion is provided with a plurality of internal threads, which are connected in a different configuration for each embodiment. For example, in one embodiment said plurality of internal threads are connected to a single inlet and to a single outlet, and in another embodiment each one of said plurality of inlets are connected to a respective inlet but to a common outlet.

In one embodiment of the feeder tube, at least a substantial portion thereof has a non-circular outer shape. This, inter alia, is advantageous compared to the prior art stack of O-rings, since the non-circular shape at least substantially prevents rotation of the feeder tube. The O-rings, on the other hand, are not locked to the same extent, which could lead to a situation, where the O-rings are caused to rotate along with the screw. This would lead to a reduced output of viscous medium from the feeder.

Further objects and advantages of the present invention will be discussed below by means of exemplifying embodiments.

BRIEF DESCRIPTION OF THE DRAWINGS

Exemplifying embodiments of the invention will be described below with reference to the accompanying drawings, in which.

DESCRIPTION OF EMBODIMENTS

Figure 1:
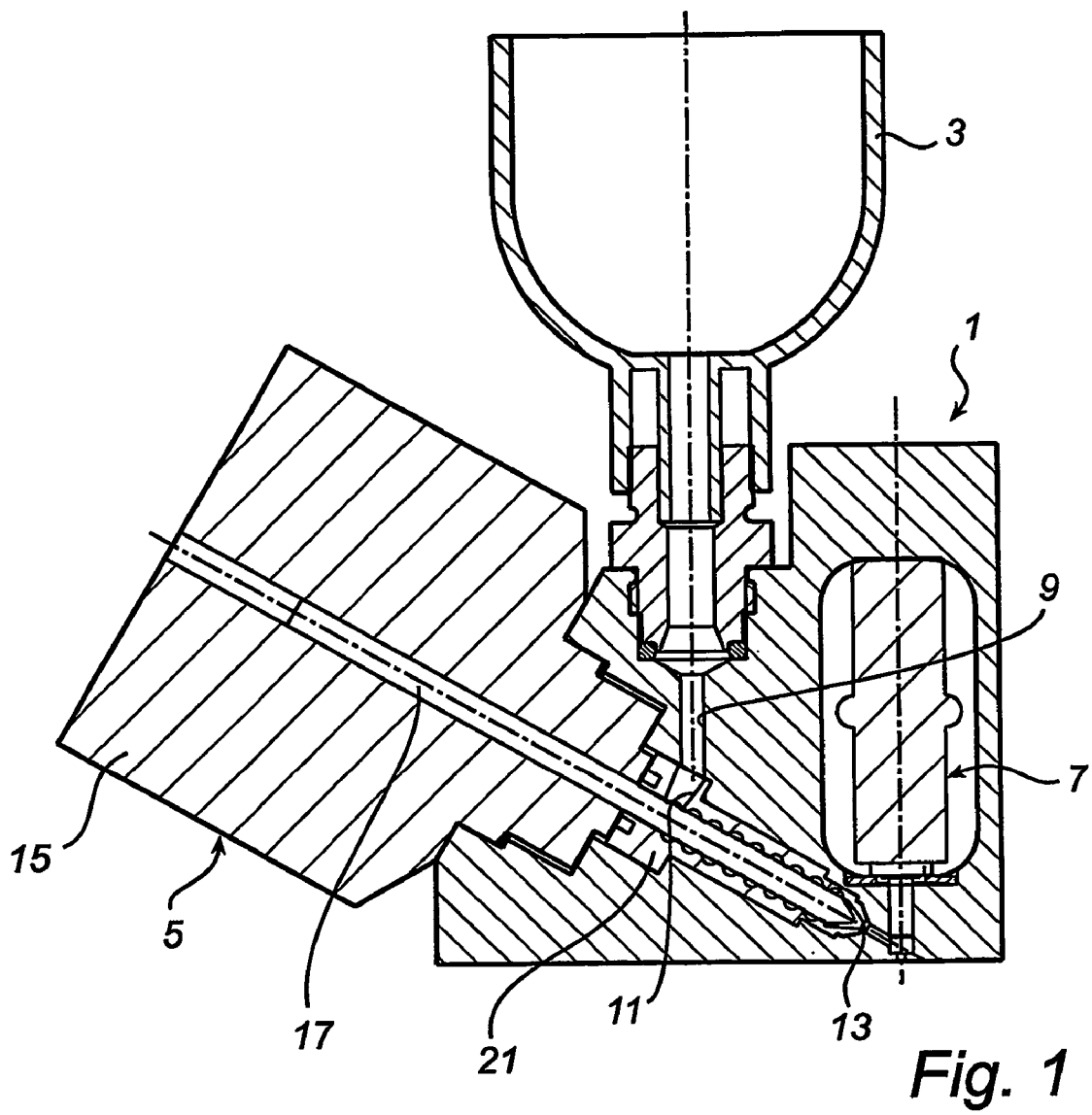
FIG. 1 is a cross-sectional view of a part of a jetting device, which employs an embodiment of the feeder according to the present invention.
Figure 2:
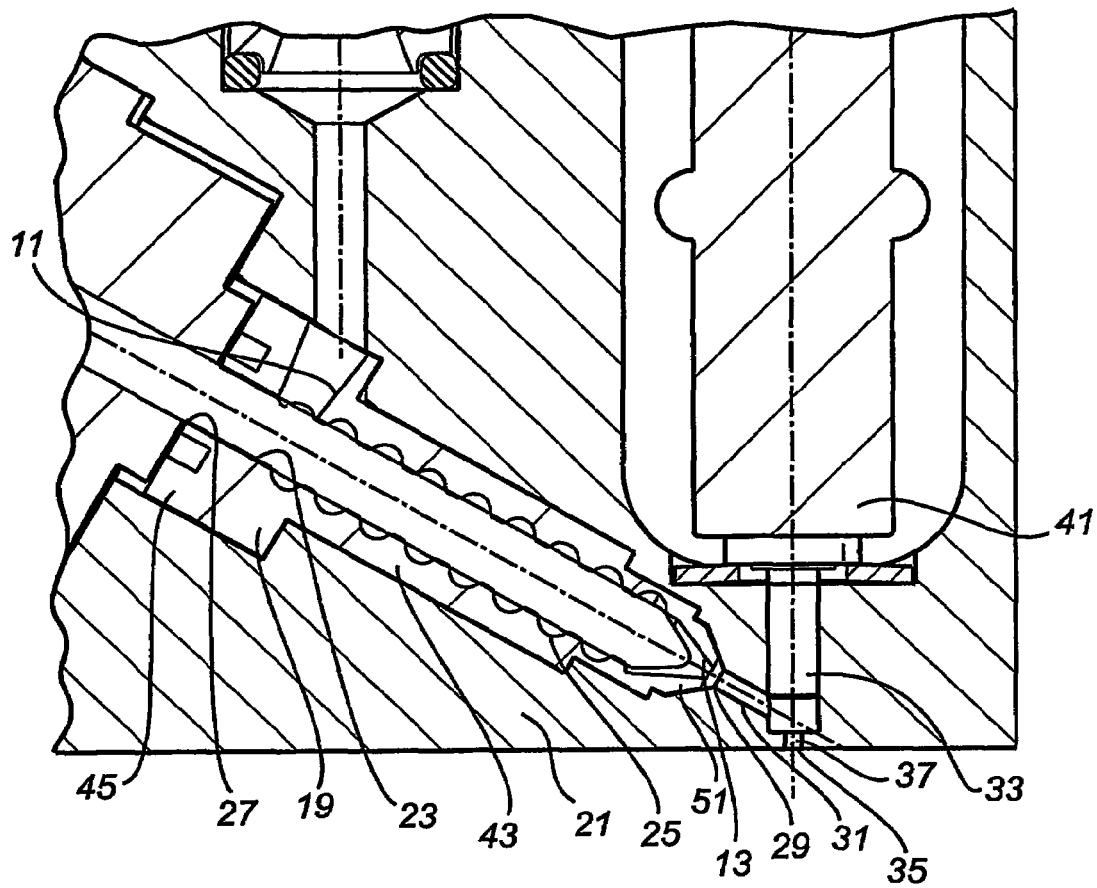
FIG. 2 is an enlargement of a part of FIG. 1.
Figure 4:
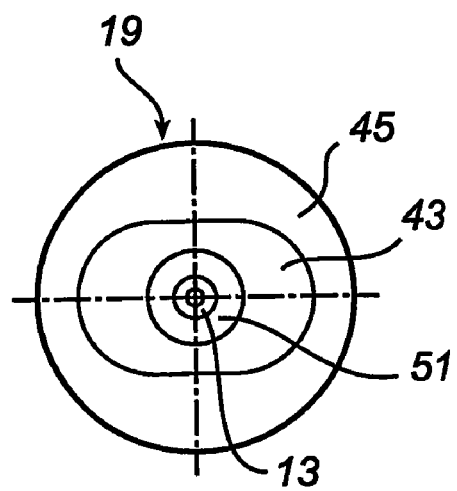
FIG. 4 is an end view of the feeder tube in FIG. 3.
Figure 3:
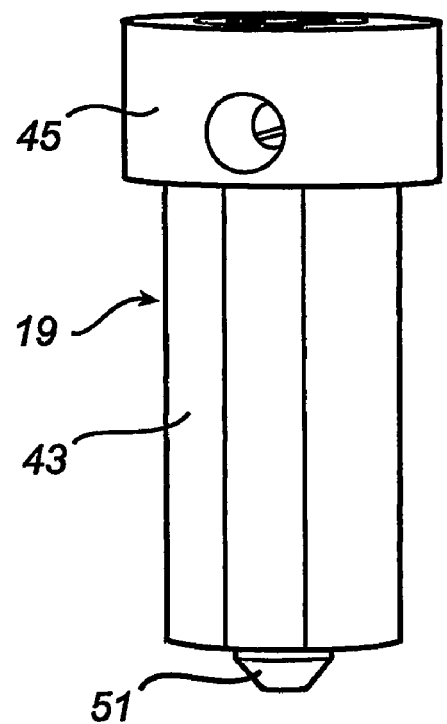
FIG. 3 is a perspective view of an embodiment of a feeder tube according to the invention.
Figure 5:
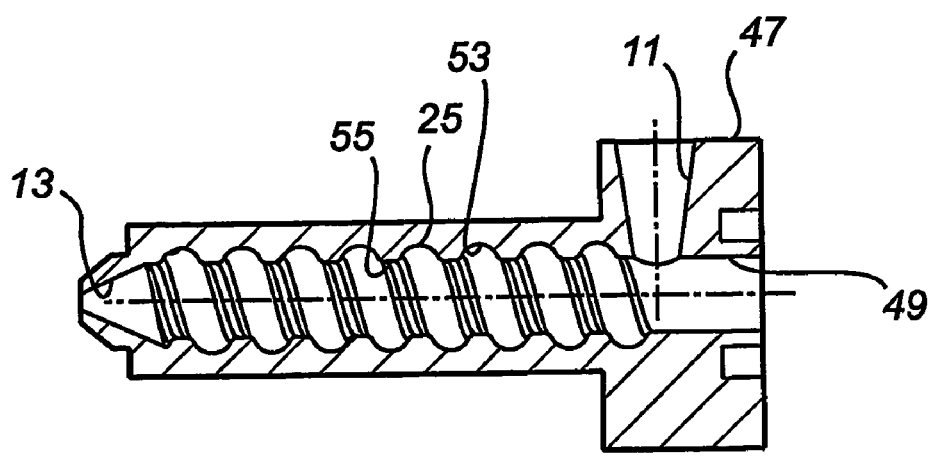
FIG. 5 is a cross-sectional view of the feeder tube in FIG. 3.

In the following, the invention will be explained in a jetting device application. However, it is to be noted that the invention will also be applicable to other types of devices comprising a viscous medium feeder. As shown in FIG. 1, a typical jetting device 1 comprises a viscous medium container 3, a feeder mechanism 5 and an eject mechanism 7. A medium channel 9 connects the medium container 3 with an inlet 11 of the feeder 5, and an outlet 13 of the feeder 5 is connected with the eject mechanism 7. More particularly, the feeder 5 comprises a drive motor 15, a shaft 17 connected to the motor 15, and a feeder tube 19 mounted in a boring of a body 21 of the device. The shaft 17 is introduced into the feeder tube 19.

As shown in greater detail in FIGS. 2-5, the feeder tube 19 has a tubular portion 23, which is a longitudinal through hole. The center axis of the tubular portion 23 coincides with the longitudinal axis of the feeder tube 19. The inlet 11 is formed close to one end 27, below called upper end, of the hole 23 and extends radially relative to said center axis, bearing the shape of a truncated cone. The outlet 13 is formed at the other end, or lower end, 29 of the hole 23, and the end of the outlet 13 corresponds with said lower end 29. A major part of the tubular portion 23 is basically cylindrical, though being provided with an internal thread 25, while the outlet hole 13 is a truncated cone, tapering towards the lower end 29. The thread 25 extends from the inlet 11 to the outlet 13.

Looking at the outer shape of the feeder tube a major elongated portion, or shaft portion, 43 thereof has a non-circular, such as oval or the like, cross-section. The corresponding portion of the boring of the body 21 has a similar shape. Thereby the mounting of the feeder tube in the body 21 at good alignment of the inlet 11 with the medium channel 9 is facilitated. Further the feeder tube 19 has a cylindrical head portion 45, which is connected with the shaft portion 43. The diameter of the head portion is in excess of that of the shaft portion 43. The inlet 11 extends radially from an outer wall 47 of the head portion 45 to an inner wall 49 thereof, see FIG. 5. An end portion 51 of the feeder tube 19 protrudes longitudinally from the shaft portion 43. The end portion 51 is partly shaped as a truncated cone and defines at least a portion of the outlet hole 13, which extends through the end portion 51.

The internal thread 25 of the feeder tube 19 consists of a groove 53 and a ridge 55 extending helically and in parallel between the inlet 11 and the outlet 13. At least the bottom of the groove 53 is curved, and preferably the cross-section of the groove 53 is arc shaped. The ridge 55, on the other hand, in this embodiment, is substantially flat in order to provide for an abutment area large enough for obtaining a good sealing against the wall of the shaft 17.

The feeder tube is made of an elastic material in order for it to be capable of adapting to possible vibrations or skewness of the shaft 17. Since the shaft, or axle, 17 is rigidly fastened at merely one end thereof, there is a likelihood of minor vibrations. Further, when the viscous medium being forced through the feeder tube is a solder paste, the small metal grains thereof are likely to be smeared between the shaft and the ridge if the feeder tube is made from a non-elastic material. The smearing could cause operational disturbances. Preferably, as mentioned above, the feeder tube is made of rubber, or some other elastomer. VITON®, and other rubber materials having similar properties are preferred rubber materials. The shaft 17 has a cylindrical portion extending from the upper end 27 to the beginning of the outlet 13, and a continuing tapered end portion terminating just before the lower end 29. A small space is provided between the tapered end portion and the wall of the outlet 13. A short passage 31 connects the end of the outlet 13 with the eject mechanism 7.

The eject mechanism comprises an eject means 33, which here is a piston, a nozzle 35 and an eject chamber 37. The piston 33 is connected to an actuator 41. The piston 33 is biased in a rest position and is movable from the rest position towards the nozzle 35 by means of said actuator 41.

In operation, the viscous medium typically is forced from the container 3 and into the inlet 11 by means of gravity or by means of a pneumatic pressure applied to the medium in the container. When the shaft 17 is rotated the medium, due to its viscosity properties, is pulled along in the rotational movement. Since the inlet 11 ends at the beginning of the thread 25, the medium is thus fed into and along the thread 25. At the end of the feeder tube 19 the medium is fed out of the outlet 13 and into the eject mechanism 7 and the very eject chamber 37 thereof. By energizing the actuator 41 the piston 33 is rapidly moved towards the nozzle 35 and an amount of medium is jetted.

The viscous medium feeder according to this invention can be used in many different types of jetting devices. However, due to many other desirable features, a jetting device of particular interest for comprising the new feeder is constructed as an exchangeable cassette, or assembly. A cassette type jetting device, for example, is disclosed in WO 00/61297. It specifically comprises a device holder mating with a stand of a viscous medium jetting machine, and an interface adapted to a complementary interface of the stand. The device holder comprises alignment and locking elements in order to obtain a precise and rigid mounting of the jetting device on the stand. The interface comprises electric, and pneumatic elements for controlling the operation of the device. An advantage of this jetting device is that, simply, the whole device is exchanged when the container is empty or another type of viscous medium is to be used.

Above, preferred embodiments of the viscous medium feeder and the associated feeder tube according to the present invention have been described. These should be seen as non-limiting examples. Many modifications will be possible within the scope of the invention as defined by the claims. Below, a few examples of such modifications will be given.

Thus, in an alternative embodiment the tubular portion of the feeder tube is provided with a plurality of internal threads. Each one of the threads is connected to said inlet and said outlet respectively.

In another alternative embodiment the tubular portion is provided with a plurality of internal threads and corresponding pluralities of inlets and outlets, wherein each thread is connected to a respective one of the inlets and to a respective one of the outlets. In this embodiment the medium channel, at the end thereof, is widened and prolonged such that it surrounds the top of the feeder tube, thereby providing all of the inlets with the medium.

In a further embodiment the tubular portion has a plurality of internal threads, a corresponding plurality of inlets, and one outlet. Each one of said plurality of threads is connected to a respective one of said plurality of inlets and to said outlet.

The invention claimed is:

1. A viscous medium feeder for providing medium droplets having substantially even amounts, comprising:
   an inlet;
   an outlet;
   a tubular portion having an internal thread connected, at one end thereof, to said inlet, and connected, at the other end thereof, to said outlet, said tubular portion being elastic;
   a rotatable shaft having a cylindrical surface of constant radius arranged in and extending coaxially with said tubular portion, said shaft abutting inner wall portions of said tubular portion; and
   a drive motor connected to said shaft,
   wherein said inner wall portions comprise a substantially constant diameter portion and an adjacent portion with a ridge of said internal thread, an edge portion of said inlet is arranged in the substantially constant diameter portion at one end of the elastic tubular portion and extends through a side wall of the elastic tubular portion, and said substantially constant diameter inner wall portion being arranged for sealing abutment against said shaft;
   and wherein said inlet ends at the beginning of said internal thread.

2. A feeder according to claim 1, said tubular portion being made from an elastomer.

3. A feeder according to claim 2, said tubular portion being made from rubber.

4. A feeder according to claim 1, said tubular portion being comprised in a demountable tube.

5. A feeder according to claim 1, said internal thread comprising a curved bottom.

6. A feeder according to claim 1, said tubular portion comprising a plurality of internal threads, each one thereof connected to said inlet and said outlet respectively.

7. A feeder according to claim 1, said tubular portion comprising a plurality of internal threads and corresponding pluralities of inlets and outlets, each thread being connected to a respective one of said inlets and to a respective one of said outlets.

8. A feeder according to claim 1, said tubular portion comprising a plurality of internal threads, a corresponding plurality of inlets, and one outlet, each thread being connected to a respective one of said inlets and to said outlet.

9. A feeder according to claim 1, said tubular portion having a tapered outlet end portion and said shaft having a tapered end extending into said tapered outlet end portion.

10. A feeder according to claim 1, said viscous medium comprising particles.

11. A feeder according to claim 1, said viscous medium being solder paste.

12. A viscous medium jetting device for providing medium droplets having substantially even amounts, comprising:
   a viscous medium container;
   a viscous medium feeder connected to said viscous medium container; and an eject mechanism connected to said viscous medium feeder,
   wherein said viscous medium feeder comprises:
   an inlet;
   an outlet;
   a tubular portion having an internal thread connected, at one end thereof, to said inlet, and connected, at the other end thereof, to said outlet, said tubular portion being elastic;
   a rotatable shaft having a cylindrical surface of substantially constant radius arranged in and extending coaxially with said tubular portion, said shaft abutting inner wall portions of said tubular portion; and
   a drive motor connected to said shaft,
   wherein said inner wall portions comprise a substantially constant diameter portion and an adjacent portion with a ridge of said internal thread, an edge portion of said inlet is arranged in the substantially constant diameter portion at one end of the elastic tubular portion and extends through a side wall of the elastic tubular portion, and said substantially constant diameter inner wall portion being arranged for sealing abutment against said shaft;
   and wherein said inlet ends at the beginning of said internal thread.

13. A viscous medium jetting device according to claim 12, further comprising a device holder mateable with a stand of a viscous medium jetting machine, and an interface adapted to a complementary interface of the stand, said interface comprising electric, and pneumatic elements for controlling the operation of the device.

14. A viscous medium jetting device comprising an eject chamber for containing a volume of said medium prior to jetting thereof, a nozzle communicating with the eject chamber, eject means for jetting said medium from the eject chamber through said nozzle, and a viscous medium feeder according to claim 1.

* * * * *